(12) United States Patent
Mathias et al.

(10) Patent No.: US 7,084,932 B1
(45) Date of Patent: Aug. 1, 2006

(54) VIDEO DISPLAY SYSTEM FOR A VEHICLE

(75) Inventors: Larry E. Mathias, Byron Center, MI (US); Paul D. Hurley, Holland, MI (US); Matthew L. Leeka, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 09/868,536

(22) PCT Filed: Dec. 28, 1999

(86) PCT No.: PCT/US99/30993

§ 371 (c)(1),
(2), (4) Date: Jan. 8, 2002

(87) PCT Pub. No.: WO00/38951

PCT Pub. Date: Jul. 6, 2000

Related U.S. Application Data

(60) Provisional application No. 60/113,876, filed on Dec. 28, 1999.

(51) Int. Cl.
*H04N 5/64* (2006.01)

(52) U.S. Cl. .............. 348/837; 348/839; 296/37.7; 296/37.8

(58) Field of Classification Search ........... 348/837, 348/838, 839; 296/37.7, 37.8; 248/921, 248/919; H04N 5/64
See application file for complete search history.

(56) References Cited

U.S. PATENT DOCUMENTS

| | | | |
|---|---|---|---|
| 3,156,493 A | 11/1964 | Griffths | |
| 3,737,184 A | 6/1973 | Swartz | |
| 3,773,378 A | 11/1973 | Lewis | |
| 4,063,739 A | 12/1977 | La Rose | |
| D247,234 S | 2/1978 | Stewart | |
| 4,079,987 A | 3/1978 | Bumgardener | |
| 4,101,159 A | 7/1978 | Stewart | |
| 4,241,870 A | 12/1980 | Marcus | |
| D260,507 S | 9/1981 | Kosugi et al. | |
| 4,383,626 A | 5/1983 | Weinblatt | |
| D282,251 S | 1/1986 | Isham et al. | |
| D282,733 S | 2/1986 | Giavazzi et al. | |
| 4,824,159 A | 4/1989 | Fluharty et al. | |
| 4,843,477 A | 6/1989 | Mizutani et al. | |
| 4,867,498 A | 9/1989 | Delphia et al. | |
| 5,034,996 A | 7/1991 | Carey et al. | |
| 5,040,990 A | 8/1991 | Suman et al. | |
| D320,587 S | 10/1991 | Kapp et al. | |
| 5,062,559 A | 11/1991 | Falcoff | |
| 5,076,524 A | 12/1991 | Reh et al. | |

(Continued)

FOREIGN PATENT DOCUMENTS

DE    4118711    12/1992

(Continued)

*Primary Examiner*—Michael H. Lee
(74) *Attorney, Agent, or Firm*—Foley & Lardner LLP

(57) ABSTRACT

A display unit (12) is provided, the display unit including a housing (20) configured for mounting in an interior region of a vehicle, and a screen (30) mounted on the housing for movement between a stowed position wherein the screen is at least partially contained within the housing and a deployed position wherein the screen projects from the housing to reveal a viewing surface (32) of the screen. When the screen is deployed, the viewing surface typically is at an angle of between 45-degrees and 90-degrees from the stowed position.

49 Claims, 13 Drawing Sheets

U.S. PATENT DOCUMENTS

| | | |
|---|---|---|
| 5,096,271 A | 3/1992 | Portman |
| 5,106,143 A * | 4/1992 | Soeters ...................... 296/37.8 |
| 5,145,128 A | 9/1992 | Umeda |
| 5,161,028 A | 11/1992 | Kawata et al. |
| 5,173,686 A | 12/1992 | Fujihara |
| 5,362,144 A * | 11/1994 | Shioya et al. ............ 312/319.6 |
| 5,397,160 A | 3/1995 | Landry |
| D363,927 S | 11/1995 | Rosen |
| 5,467,106 A * | 11/1995 | Salomon ...................... 345/87 |
| 5,469,298 A | 11/1995 | Suman et al. |
| D367,477 S | 2/1996 | Rosen |
| 5,522,638 A | 6/1996 | Falcoff et al. |
| 5,667,179 A | 9/1997 | Rosen |
| 5,706,130 A | 1/1998 | Rosen |
| 5,709,360 A | 1/1998 | Rosen |
| D390,143 S | 2/1998 | Rosen |
| D390,219 S | 2/1998 | Rosen |
| D391,951 S | 3/1998 | Rosen |
| 5,738,392 A | 4/1998 | Portman |
| 5,738,932 A | 4/1998 | Kondo et al. |
| 5,743,487 A | 4/1998 | Rice |
| 5,745,582 A * | 4/1998 | Shimpuku et al. ............ 381/77 |
| D394,432 S | 5/1998 | Rosen |
| 5,751,548 A * | 5/1998 | Hall et al. ................... 361/686 |
| 5,775,762 A | 7/1998 | Vitito ......................... 296/37.7 |
| D398,921 S | 9/1998 | Rosen |
| D399,200 S | 10/1998 | Rosen |
| D399,503 S | 10/1998 | Rosen |
| 5,822,023 A | 10/1998 | Suman et al. ............... 348/837 |
| 5,825,096 A | 10/1998 | Morimoto et al. |
| D402,970 S | 12/1998 | Rosen |
| D405,444 S | 2/1999 | Rosen |
| D406,582 S | 3/1999 | Rosen |
| D407,086 S | 3/1999 | Rosen |
| 5,887,939 A | 3/1999 | Yamaguchi et al. |
| D408,029 S | 4/1999 | Rosen |
| D409,597 S | 5/1999 | Rosen |
| D410,458 S | 6/1999 | Rosen |
| D411,822 S | 7/1999 | Ellis |
| D412,167 S | 7/1999 | Rosen |
| 5,927,784 A | 7/1999 | Vitito |
| D412,899 S | 8/1999 | Rosen |
| 5,946,055 A * | 8/1999 | Rosen ......................... 348/837 |
| D413,856 S | 9/1999 | Scribner |
| D415,056 S | 10/1999 | Ellis |
| D416,188 S | 11/1999 | Rosen et al. |
| D416,251 S | 11/1999 | Rosen |
| 5,986,634 A * | 11/1999 | Alioshin et al. ............ 345/649 |
| 5,996,954 A | 12/1999 | Rosen et al. |
| 6,003,925 A | 12/1999 | Litke et al. |
| 6,007,036 A | 12/1999 | Rosen |
| D418,831 S | 1/2000 | Rosen et al. |
| 6,059,255 A | 5/2000 | Rosen |
| D428,849 S | 8/2000 | Higginson |
| D430,545 S | 9/2000 | Rosen |
| 6,115,086 A | 9/2000 | Rosen |
| 6,124,902 A | 9/2000 | Rosen |
| D434,400 S | 11/2000 | Rosen |
| D434,414 S | 11/2000 | Rosen |
| D435,024 S | 12/2000 | Rosen |
| 6,157,418 A | 12/2000 | Rosen |
| 6,179,263 B1 | 1/2001 | Rosen et al. |
| 6,181,387 B1 | 1/2001 | Rosen |
| D437,836 S | 2/2001 | Rosen |
| D438,850 S | 3/2001 | Rosen |
| D439,226 S | 3/2001 | Rosen |
| 6,246,449 B1 | 6/2001 | Rosen |
| 6,380,978 B1 * | 4/2002 | Adams et al. ............... 348/452 |

FOREIGN PATENT DOCUMENTS

| | | |
|---|---|---|
| DE | 44 06 872 | 9/1994 |
| EP | 131988 | 1/1985 |
| JP | 60051087 | 3/1985 |
| JP | 60051088 | 3/1985 |
| JP | 61137048 | 8/1986 |
| JP | 63219440 | 9/1988 |
| JP | 6415479 | 1/1989 |
| JP | 1300775 | 12/1989 |
| JP | 2007082 | 1/1990 |
| JP | 226871 | 2/1990 |
| JP | 277159 | 6/1990 |
| JP | 2144242 | 6/1990 |
| JP | 2149083 | 6/1990 |
| JP | 2172379 | 7/1990 |
| JP | 2174475 | 7/1990 |
| JP | 2118368 | 9/1990 |
| JP | 3010476 | 1/1991 |
| JP | 366272 | 6/1991 |
| JP | 3054041 | 6/1991 |
| JP | 3189620 | 8/1991 |
| JP | 4005142 | 1/1992 |
| JP | 414549 | 2/1992 |
| JP | 428145 | 3/1992 |
| JP | 4111688 | 4/1992 |
| JP | 4201639 | 7/1992 |
| JP | 496559 | 8/1992 |
| JP | 5050883 | 3/1993 |
| JP | 5097098 | 4/1993 |
| JP | 6092187 | 4/1994 |
| JP | 7025289 | 1/1995 |
| JP | 7162783 | 6/1995 |
| JP | 8044299 | 2/1996 |
| JP | 08282391 | 10/1996 |
| JP | 9005721 | 1/1997 |
| JP | 09286283 | 11/1997 |
| JP | 11342798 | 12/1999 |
| WO | WO 99/00976 | 1/1999 |

* cited by examiner

VIDEO DISPLAY SYSTEM FOR A VEHICLE

This application is a 371 of PCT/US/99/30993, filed on Dec. 28, 1999, which claims benefit of 60/113,876, filed on Dec. 28, 1998.

BACKGROUND OF THE INVENTION

1. Field of the Invention

The present invention relates generally to a video display system, and, more particularly, to a video display system which is mountable in a vehicle and also removable for use outside the vehicle.

2. Discussion of the Related Art

Televisions and video cassette players have recently become quite popular in motor vehicles as a means of providing entertainment for both children and adults. Such devices, for the most part, however, have been limited to use in larger vehicles such as sport utility vehicles, mini-vans, and full size vans due to the space requirements for conventional televisions and video cassette players. Such systems have often been mounted in a console on the floor of a vehicle, as well as to the headliner of a vehicle. In either mounting, such systems require a significant amount of space. Also, such systems have typically not been removable easily from the vehicle for use outside the vehicle with an AC power source.

More recently advances in Liquid Crystal Display (LCD) panels have significantly improved the picture and contrast afforded by these types of displays, making them suitable for use in a wide variety of applications. LCDs are much thinner than conventional cathode ray tubes (CRTs) and therefore require significantly less space than a conventional television employing a CRT as a picture tube. LCDs are also much lighter in weight than CRTs, therefore making them readily portable, as evidence by the popularity of laptop computers. The lightweight and compact configuration of an LCD panel would therefore enable it to easily be mounted in various interior areas of a motor vehicle such as a sport utility vehicle, truck, van, or car, where the mounting of a video screen having a CRT would not be possible because of space constraints.

Even more recently, Digital Video Disc (DVD) players have become increasingly popular. DVD players are significantly more compact than video cassette players, lighter in weight, generate less heat and offer significantly enhanced picture and sound quality over a VHS format videocassette. The extremely compact dimension of a DVD, which is essentially the same as a compact disc, further enables the dimensions of the DVD player to be kept very compact. DVD players are not limited to playing video discs, but can also play compact discs as well.

In view of the foregoing performance and compact size advantages offered by LCD panels and DVD players, it would be highly desirable to incorporate both such devices into an integrated LCD/DVD unit which could be easily mounted within a motor vehicle such as a car, sport utility vehicle, van, mini-van, or truck. More preferably, it would be highly desirable to incorporate an integrated LCD/DVD unit into a console in such a manner that the LCD/DVD unit can be quickly and easily moved into a viewable position, such as flipped down from a headliner mounted console, and also easily moved into a stowed position so that it is out of the way when not in use.

It would further be highly desirable to provide an LCD/DVD player which can be quickly and easily removed from its associated console so that the entire unit can be used outside of the vehicle with an alternate AC or DC power source.

SUMMARY OF THE INVENTION

The present invention relates to an integrated visual display/digital media player in the form of an integrated LCD/DVD unit or video display system and a docking member which is movably mounted within a console. The video display system can be used to watch material contained on digital video discs or to play compact discs, provided speakers are coupled to the video display system.

In one preferred embodiment, the video includes a housing and a screen console having a screen. The screen console is moveable between a first position and a second position. A digital video disc player is simultaneously integrally positioned within one of the housing and the screen console and operably connected to the screen.

In another preferred embodiment the video display system is releasably coupled to the docking member. The docking member is in turn movably coupled to the console. The console may be mounted at many places within the vehicle, but in the preferred embodiment is mounted to the headliner of the vehicle. A latch on the back of the docking member automatically holds it in a retracted or "stowed" position when the unit is inserted into the docking member and then folded up into the console. Latch assemblies on the video display system releasably secure it to the docking member yet permit the unit to be easily uncoupled from the docking member and removed for use outside of the vehicle.

The present invention requires only a small portion of the space required by a television having a cathode ray tube and a video cassette player. When in the stowed position, the video display system is held within its associated console and forms an unobtrusive system which does not interfere appreciably with the driver's vision out of the rear of the vehicle, when mounted in the headliner. The system, however, is compact enough to readily permit mounting in outer areas, such as the rear of the two front seats or on a floor mounted console.

In addition, the smaller packaging and footprint of the present invention make the video display system easier to incorporate into various styles and types of vehicles.

In addition, the video display system of the present invention can be removed from the docking station which is located in the headliner and placed in another docking station which is located remote from the vehicle. This enables the video display system to be used for entertainment when at a location outside the vehicle. Further, the video display system may also incorporate a television tuner and/or cable adapter so as to allow the video display system to display television programs.

Other objects and advantages of the present invention will become apparent to those skilled in the art upon reading the following detailed description and upon reference to the following drawings.

BRIEF DESCRIPTION OF THE DRAWINGS

The various advantages of the present invention will become apparent to one skilled in the art upon reading the following specification and by reference to the drawings in which.

DETAILED DESCRIPTION OF THE PREFERRED EMBODIMENTS

The following description of the preferred embodiments is merely exemplary in nature, and are in no way intended to limit the invention or its application or uses. Moreover, while the detailed description discloses a specific vehicle interior trim component embodiment, one skilled in the art will recognize that any vehicle interior trim component could incorporate the present invention.

Figure 1:
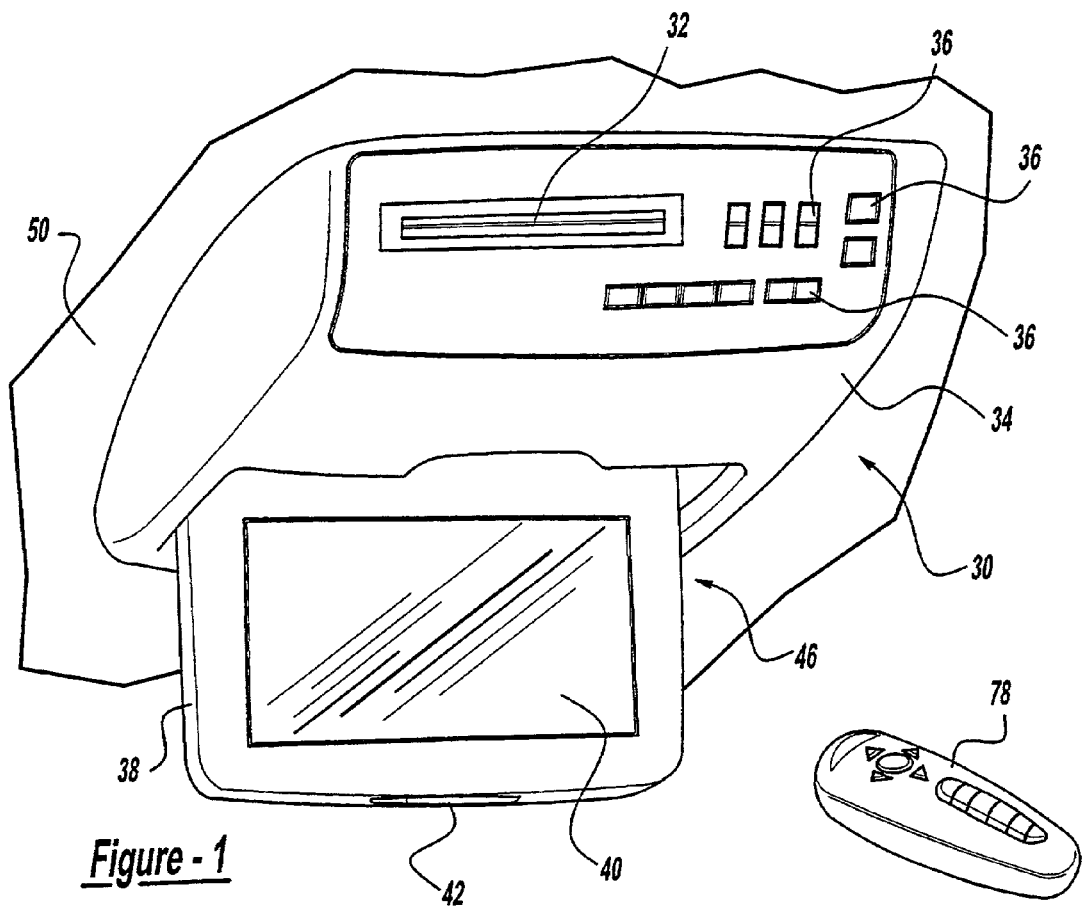
FIG. 1 is a front perspective view of a preferred embodiment made in accordance with the teaching of the present invention.
Figure 2:
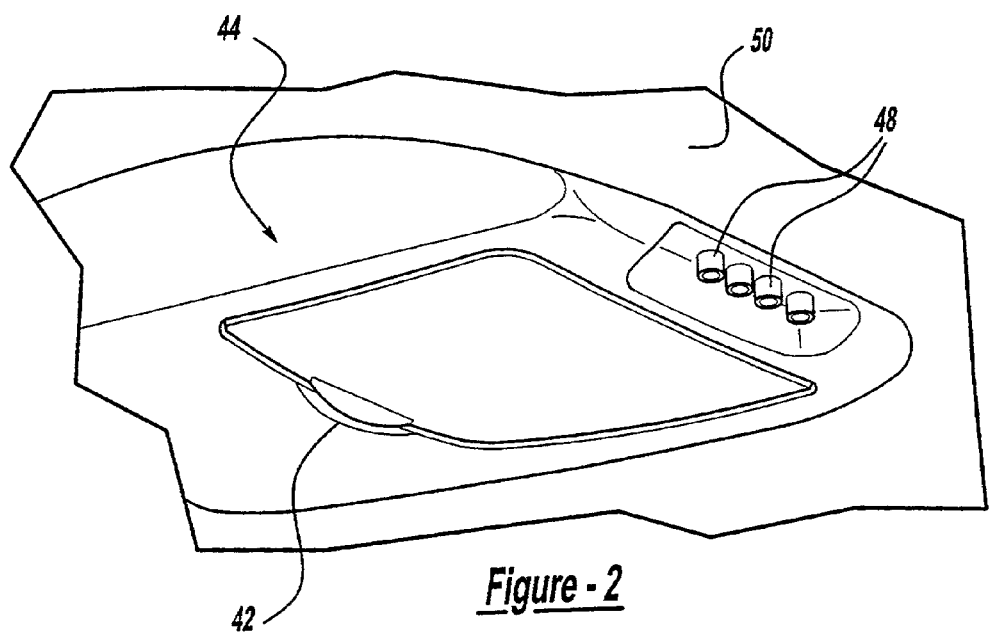
FIG. 2 is a rear perspective view of the embodiment shown in FIG. 1 made in accordance with the present invention.

Referring to FIGS. 1 and 2, a video display system 30 is shown. The video display system 30 includes a digital video disc (DVD) player 32 that is integrated in a housing 34. The housing 34 also includes a plurality of controls 36 that allow a user to operate the DVD player 32. A screen console 38 having a screen portion 40 is rotatably mounted to the housing 34. Releasing a latch mechanism 42 allows the screen console 38 to rotate from a first or closed position 44 to a second or open position 46. The latch mechanism 42 is positioned substantially on the screen console 38 engageable with a portion of the housing 34. Alternatively, the latch mechanism 42 can be positioned substantially on the housing 34 engageable with a portion of the screen console 38. A plurality of audio connectors 48 is also integrated with the housing extending from the housing such that a user could connect speakers, headphones, or other conventionally known listening devices to the video display system 30.

Although the video display system 30 is depicted in FIGS. 1 and 2 as being mounted to a headliner of a motor vehicle interior, it will be appreciated by one of ordinary skill in the art that the video display system 30 could be mounted in several areas of a vehicle, including, but not limited to, a seat back, a floor console, a center armrest console, etc. Additionally, the video display system 30 is not limited to automotive applications. The video display system could easily be incorporated into similar components within the cabin of a boat, aircraft, etc.

Figure 3:
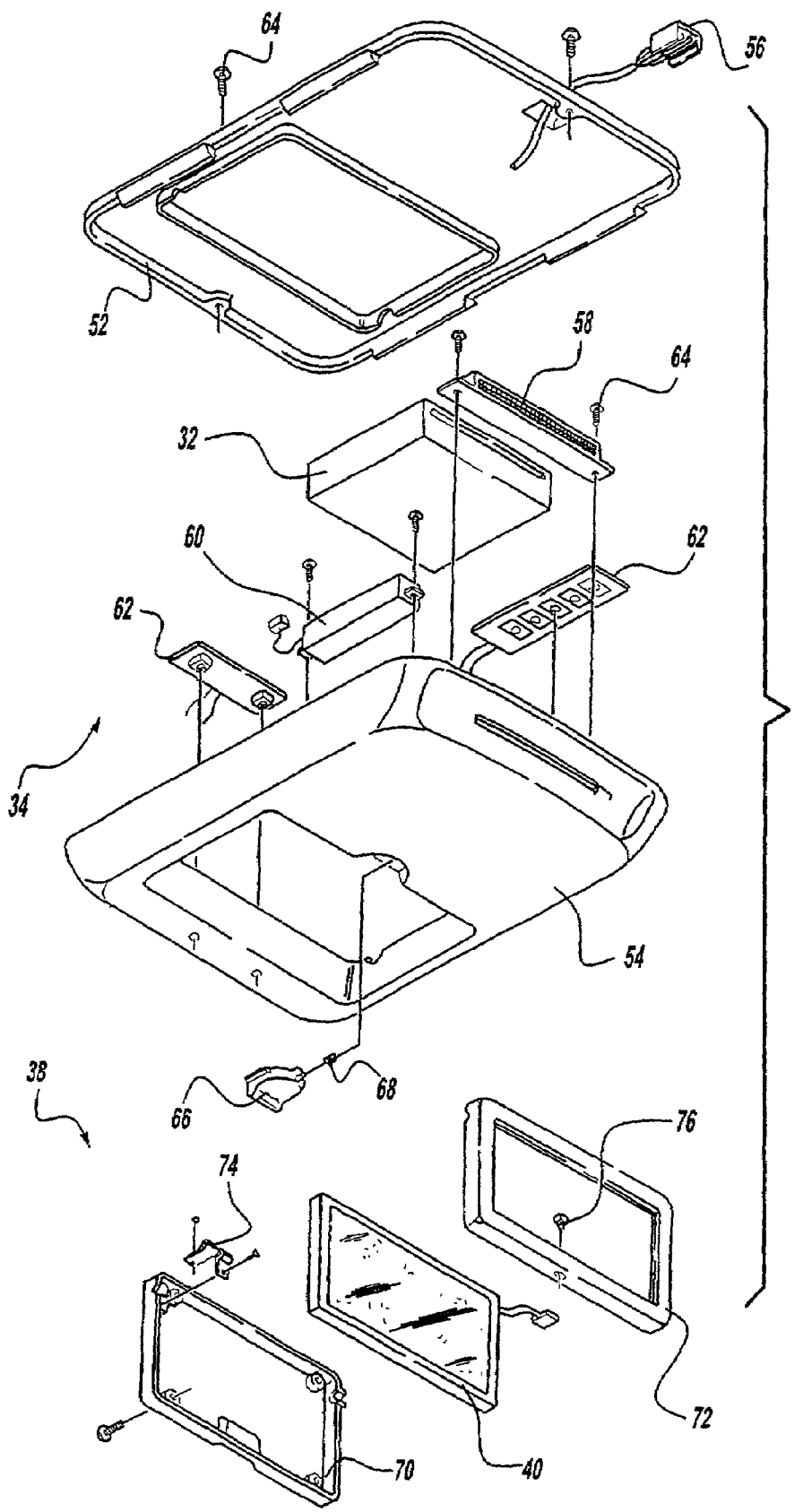
FIG. 3 is an exploded view of the preferred embodiment shown in FIG. 1 made in accordance with the present invention.

Referring to FIG. 3, the components of the video display system 30 are shown. The housing 34 includes a retainer portion 52 and a bezel portion 54, with a vehicle interface wiring harness 56 extending through the retainer portion 52 and the bezel portion 54 including a plurality of apertures 55. The plurality of apertures 55 are positioned accordingly on the bezel portion 54 in order to accommodate digital video discs and the plurality of controls 36. Several components are integrated in the bezel portion 54 and the retainer portion 52 of the housing 34. These components include the DVD player 32, a disk wiper assembly 58, and a power supply 60. Additionally, printed circuit boards 62 are integrated into the housing 34 providing, among other things, a user input and output interface with the audio connectors 48 and the plurality of controls 36. Each of the components are fixedly secured within the housing. In a preferred embodiment, threaded fasteners 64 are used for this purpose. However, one of ordinary skill in the art will appreciate that other types of fasteners could be used with equal results and, therefore, are within the scope of this disclosure. Additionally, each component is operatively associated with the other components in any known conventional manner such that the DVD player functions as it is intended and, therefore, is also within the scope of one of ordinary skill in the art.

In FIG. 3, the first latch mechanism 42 includes a latch portion 66 and a latch spring 68 operatively associated with the bezel portion 54 of the housing 34 in order to retain the screen console 38 in a first or closed position 44. Alternatively, the first latch mechanism 42 could be positioned within the screen console 38 and operatively associated with the housing 34 in order to releasably retain the screen console 38 within the housing 34.

The screen console 38 includes a screen 40, preferably a liquid crystal display, positioned within a rear cover 70 of the screen console and a front cover 72 of the screen console 38. The screen console 38 is moveably associated with the housing 34. In a preferred embodiment, the screen console 38 is rotatably or pivotally associated with the housing 34 through the use of a torque hinge 74. The torque hinge 74 provides a smooth, constant, and controlled rotation of the screen console 38 from the first or closed position 44 to the second or open position 46 after the latch mechanism 42 is actuated by a user. One of ordinary skill in the art will appreciate that various types of hinge mechanisms can be used with equal results. Additionally, one of ordinary skill in the art will appreciate that the screen console 38 and screen 40 could be movably associated with the housing 34 such that the screen console moved from the first or closed position 44 to the second or open position 46 along an axial path after the latch mechanism 42 had been actuated. This type of movement would include, but is not limited to sliding in an upwardly or downwardly facing direction.

The screen 40 is also operatively associated with the components integrated in the housing 34 such that the DVD player 32 functions as intended in any conventionally known manner. Connecting the screen 40 in this manner is also within the skill of one of ordinary skill in the art. Additionally, conventionally known fasteners 64 are used to attach the torque hinge 74 to the housing 34 and the screen console 38. Conventionally known fasteners 64 are also used to attach the front cover 72 to the rear cover 70 thereby retaining the screen 40 within the screen console 38.

Also positioned on the screen console 38 is an infrared transmitter/receiver 76. Alternatively, the infrared transmitter/receiver 76 could be positioned on the housing 34 with equal results. The infrared transmitter/receiver 76 is operable to receive control signals from a remote control device 78 actuated by the user and operable to send audio signals to remote locations including, but not limited to, infrared headphones and speakers.

In an alternative preferred embodiment, the video display system 30 components can be operably arranged and integrated into the screen console 38 forming a self contained video player unit 79 that is detachable from the housing 34. This alternative preferred embodiment will now be described in greater detail with features corresponding to the features of the above-described embodiment being referenced using the same reference numbers and reference signs.

Figure 4:
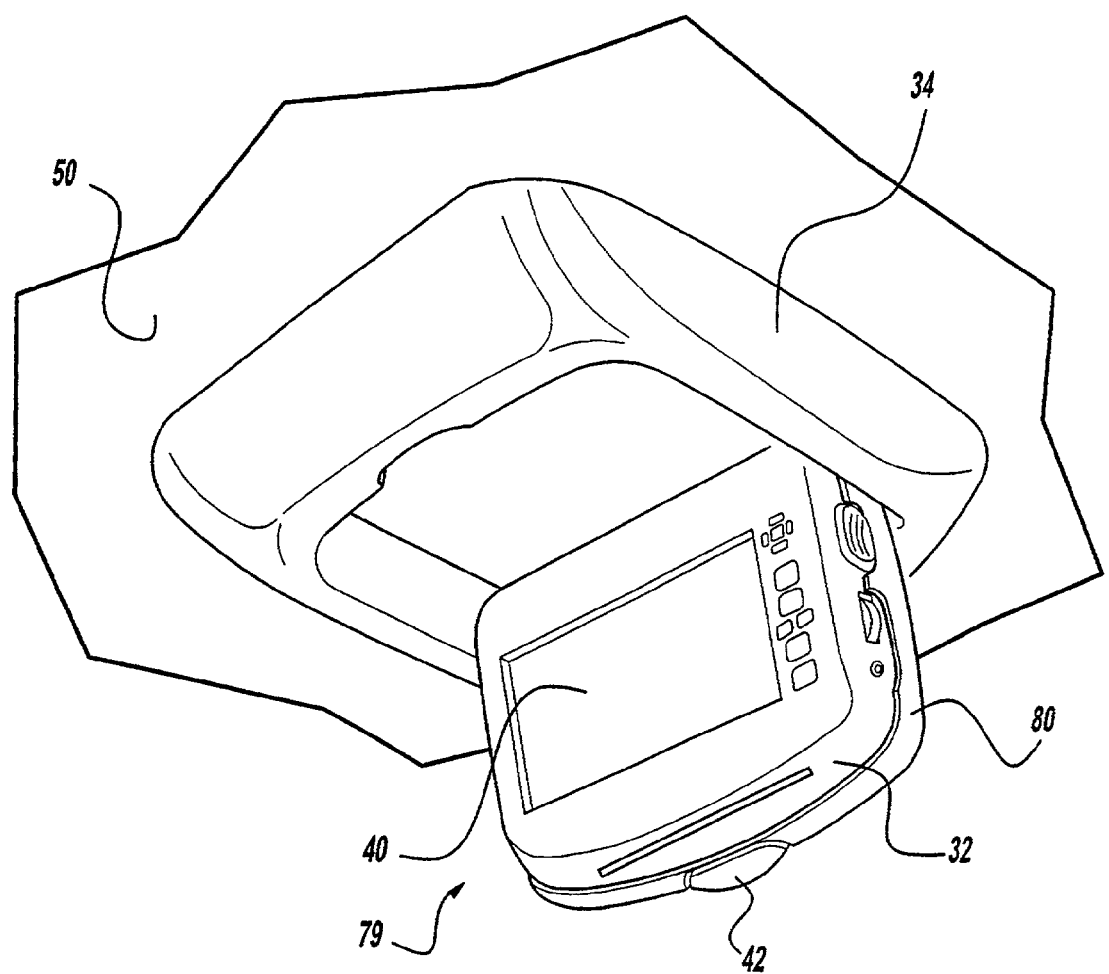
FIG. 4 is a front perspective view of an alternative preferred embodiment made in accordance with the present invention.
Figure 4:
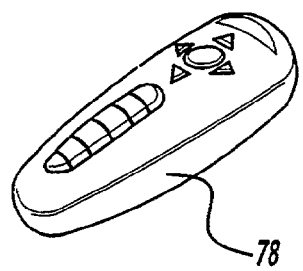

Referring to FIG. 4, the video display system 30 of an alternative preferred embodiment is shown. The video display system 30 includes a DVD player 32 and a screen 40 integrated in a screen console 38 forming a video player unit 79 releasably attached to a housing panel 80. The housing panel 80 is moveably attached to the housing 34 and is operable to move between a first or closed position 44 and a second or open position 46, as previously described with reference to FIGS. 1–3. The housing panel 80 also incorporates a first latch mechanism 42 that releasably retains the screen console 38 and the housing panel 80 in the first or closed position 44 and, when actuated by a user, allows the screen console 38 and the housing panel 80 to be released and moved to the second or open position 46. In this embodiment, the screen 40 is a liquid crystal display.

Figure 5:
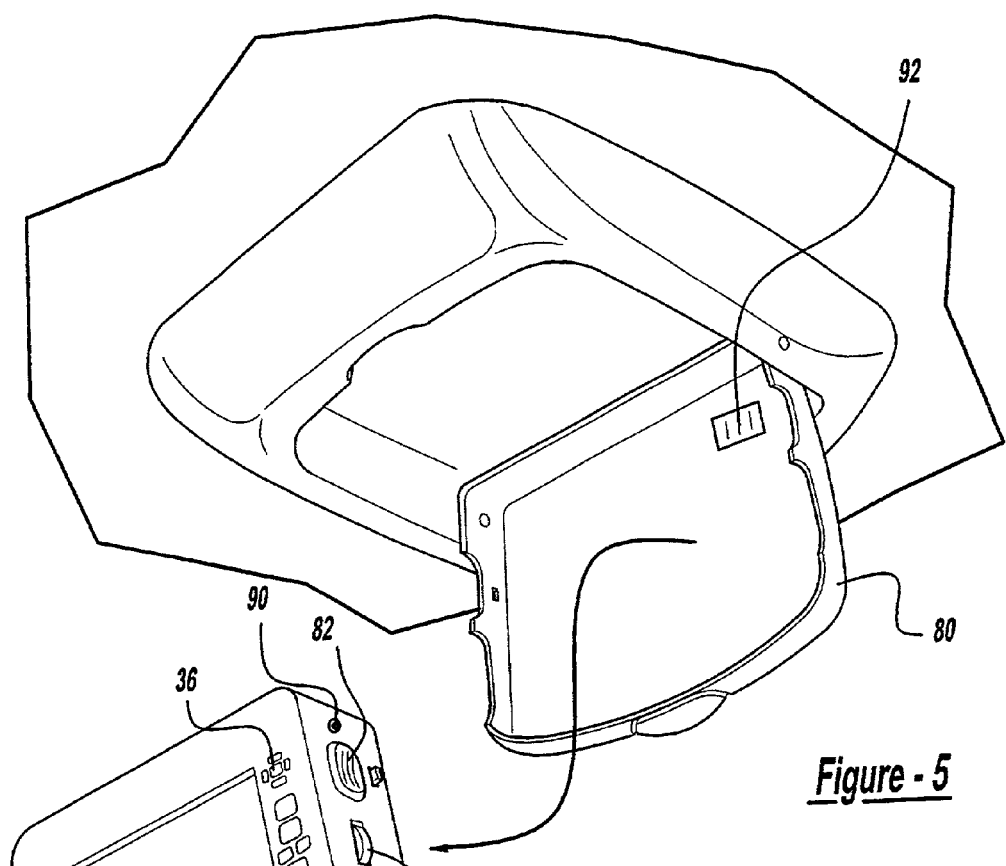
FIG. 5 is an exploded view of the embodiment shown in FIG. 4 made in accordance with the present invention.

Referring to FIG. 5, the screen console 38 is shown detached from the housing panel 80. The screen console 38 includes a second latch mechanism 82 operatively associated with the panel housing 80 to releasably connect the screen console 38 to the housing panel 80. In this embodiment, the screen console 38 also includes an infrared transmitter/receiver 76 operable to receive control signals from a remote control device 78 and operable to send audio signals to remote locations including, but not limited to, infrared headphones and speakers. Additionally, the screen console includes a plurality of controls 36 that allow the user to operate the DVD player and a slot 81 allowing insertion and removal of the digital video disc. The screen console 38 also incorporates an audio connector 86 and a corresponding audio control switch 88. One of ordinary skill in the art will appreciate that the audio connector 86 is operable to receive a connector from headphones or speakers.

Figure 7A:
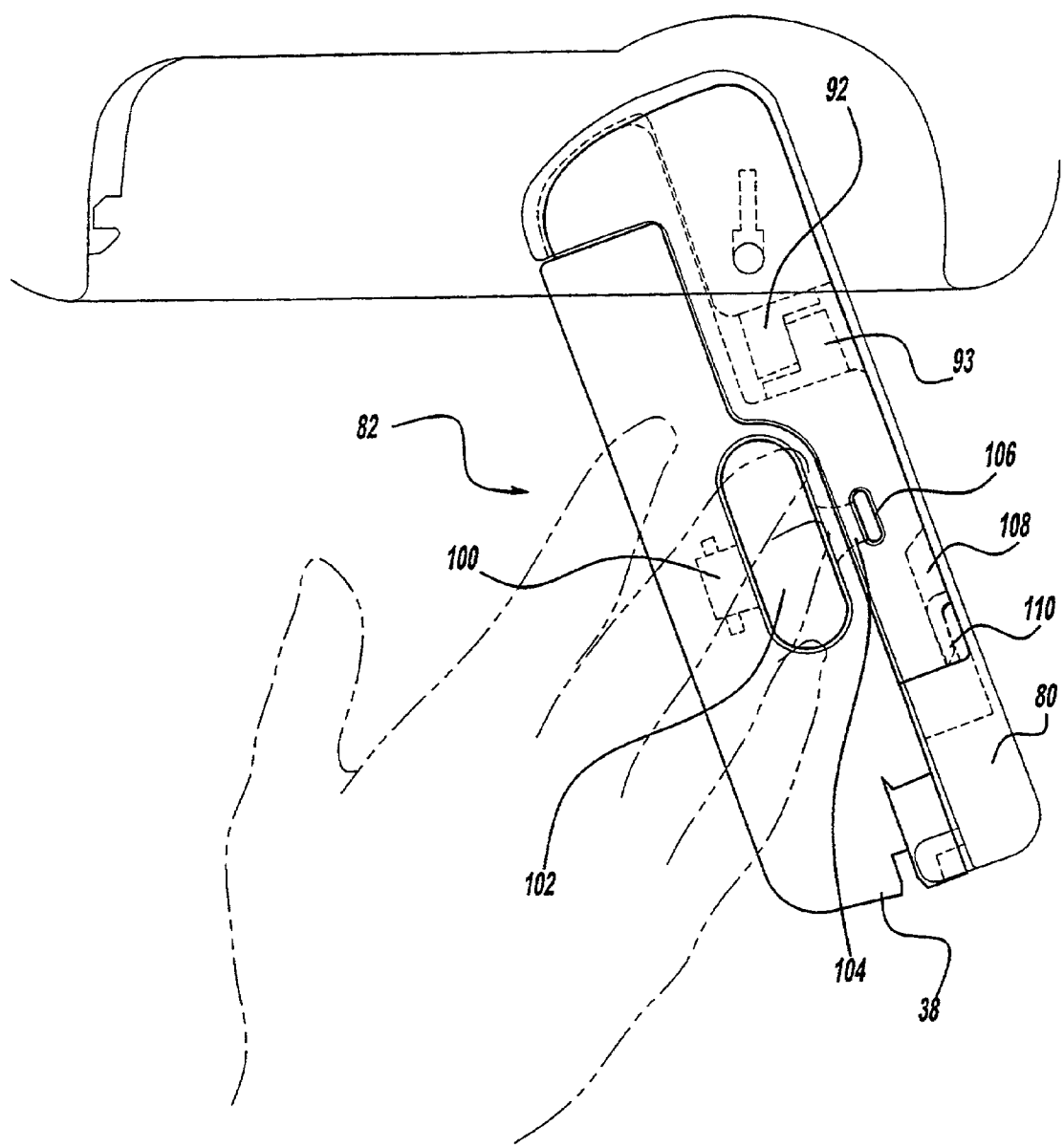
FIGS. 7a–7c are side views of the latch mechanism of the embodiment shown in FIG. 4 made in accordance with the present invention.
Figure 7B:
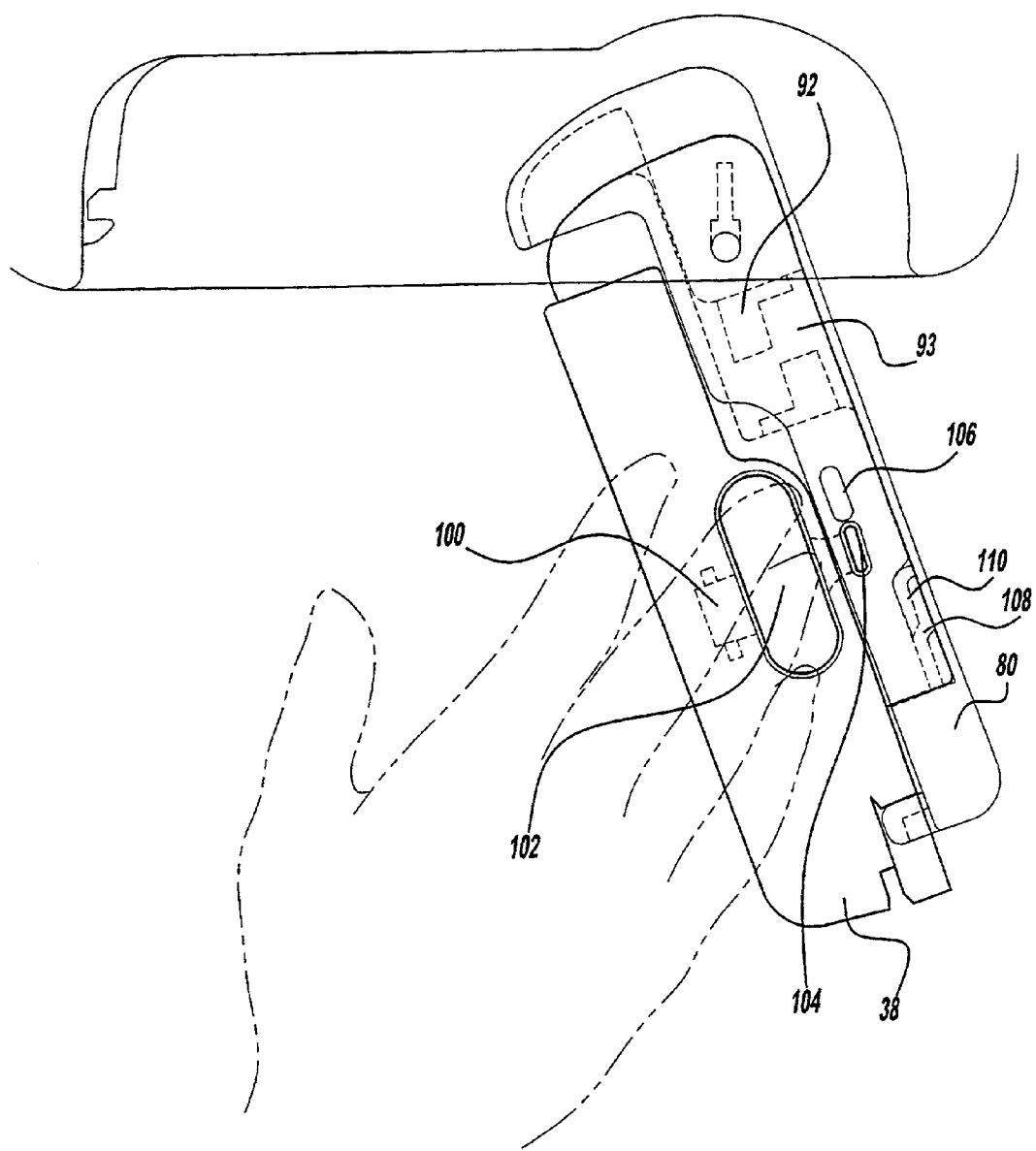
Figure 7C:
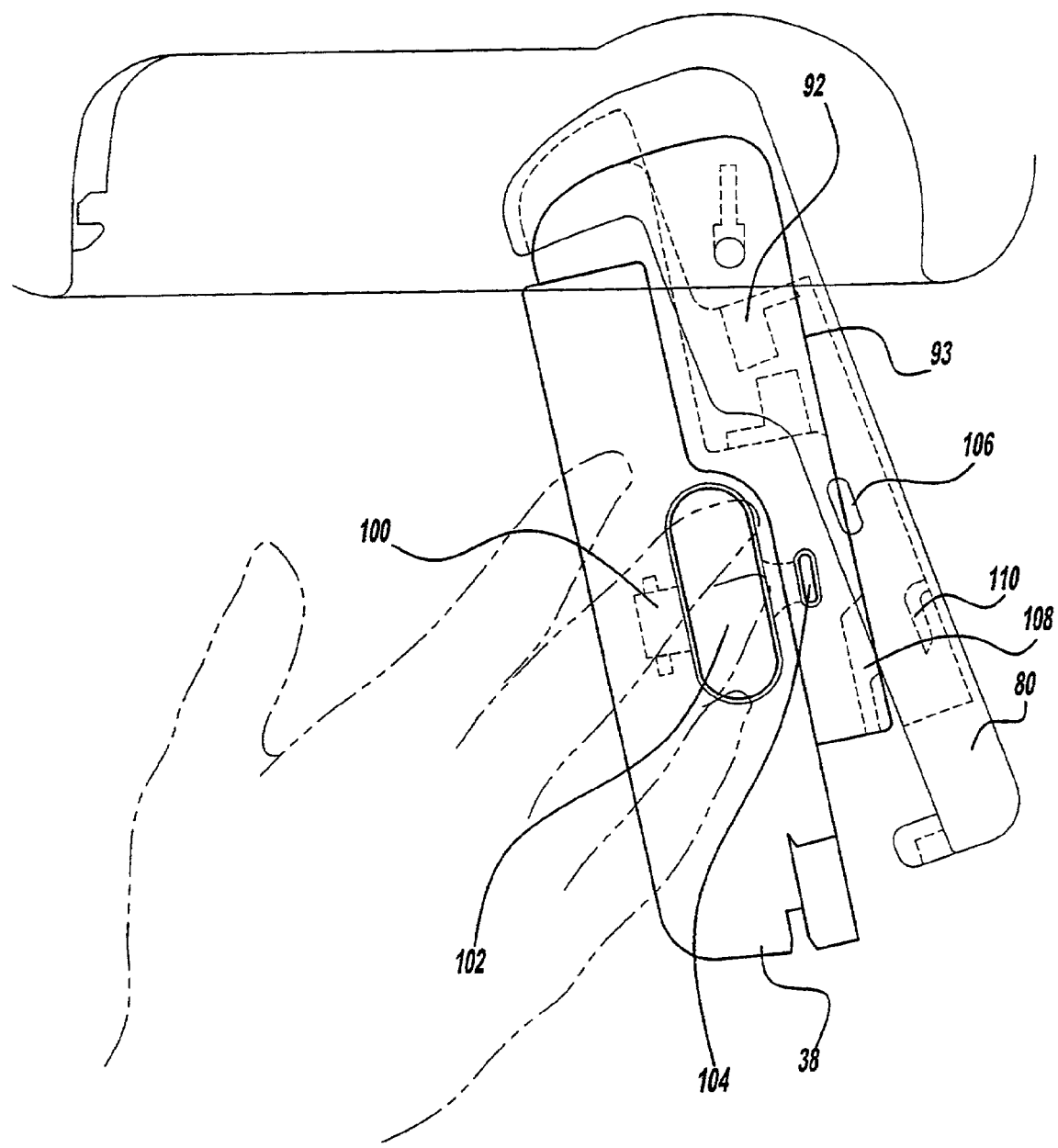

The screen console 38 in this embodiment also includes an auxiliary power connector 90. Again, one of ordinary skill in the art will appreciate that this connector is operable to receive power from various types of remote sources including, but not limited to an alternating current power source (e.g. a conventionally known power outlet in a home), and a direct current power source (e.g. a automobile battery, a conventionally known battery, etc.). Additionally, a rechargeable battery can be integrated in the screen console 38 providing power to the video player unit 79 when the video player unit 79 is detached from the housing panel 80 and being used in a portable capacity. The rechargeable battery recharges using the vehicle's electric power supply when the video display unit 79 is attached to the housing panel 80. As can be seen in FIG. 5, the housing panel 80 also includes a wiring harness connector 92 operable to engage a corresponding wire harness connector 93, as shown in FIGS. 7a–7c, positioned on a rear side of the screen console 38.

Although this embodiment is shown mounted to a headliner 50 of an automobile, it is within the scope of this disclosure that this video display system 30 could also be mounted to other interior components located within the automobile, including, but not limited to, seat backs, center consoles, etc.

Figure 17:
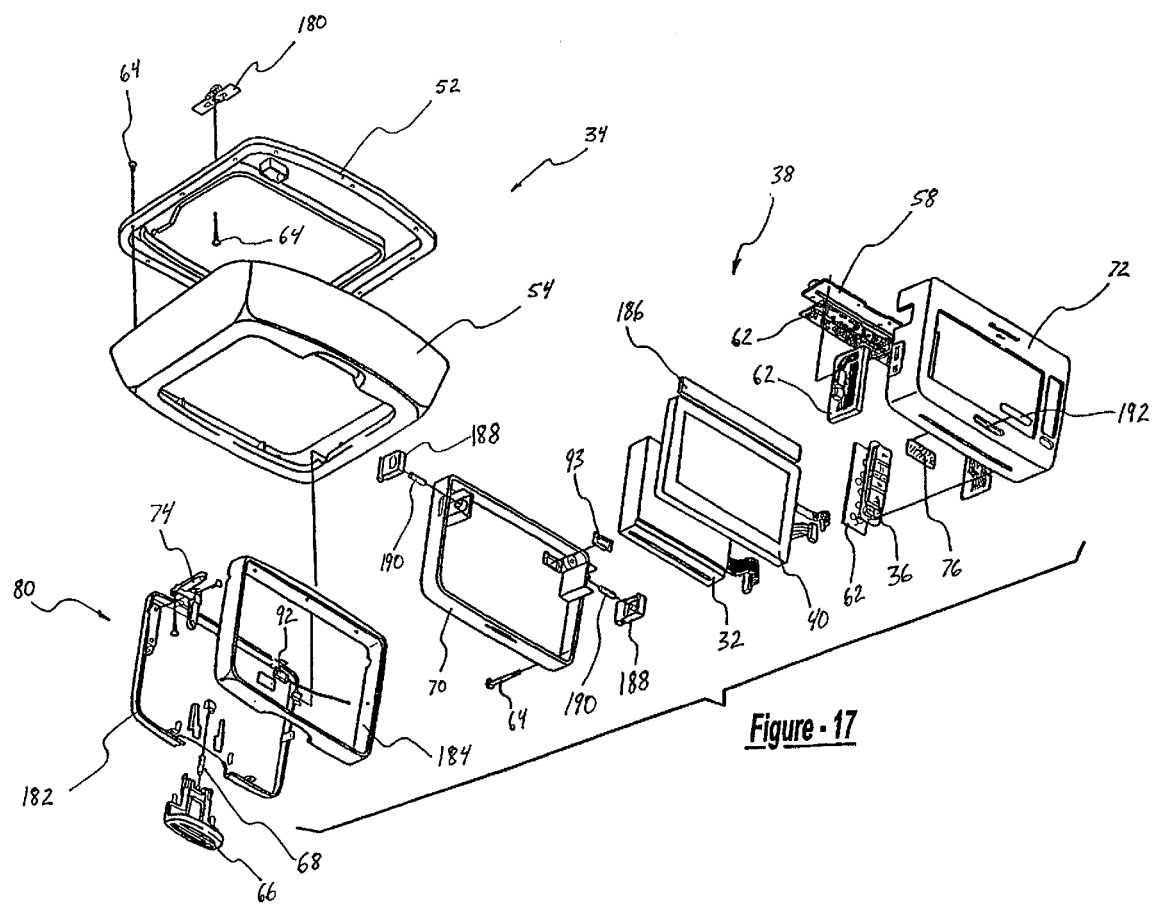
FIG. 17 is an exploded view of the embodiment shown in FIG. 4 made in accordance with the present invention.

Referring to FIG. 17, the components of the video display system 30 of the alternative preferred embodiment shown in FIGS. 4 and 5 are shown. The housing 34 includes a retainer portion 52 attached to a bezel portion 54 using threaded fasteners 64. The housing 34 is attached to an interior trim component of a vehicle using at least one attachment clip 180. Although threaded fasteners 64 are used in this embodiment, it is specifically contemplated and, therefore, within the scope of this disclosure, that the retainer portion 52 and the bezel portion 54 can be attached together through any conventionally known means including, but not limited to, other types of fasteners and attachment brackets molded into the retainer portion and/or the bezel portion 54.

The housing panel 80 includes a display carrier portion 182 and a display carrier trim portion 184 fastened to each other using the means previously described. The housing panel 80 is moveably associated with the housing 34. In this preferred embodiment, the housing panel 80 is rotatably or pivotally attached to the housing 34 through the use of a torque hinge 74. The torque hinge 74 provides a smooth, constant, and controlled rotation of the housing panel 80 from the first or closed position 44 to the second or open position 46 after the latch mechanism 42 is actuated by a user. One of ordinary skill in the art will appreciate that various types of hinge mechanisms can be used with equal results. In this embodiment, the first latch mechanism 42 including a latch portion 66 and a spring latch 68 is positioned substantially on the housing panel 80 and operatively associated with the bezel portion 54 of the housing 34 in order to retain the screen console 38 in a first or closed position 34.

The screen console 38 includes a screen 40 and a DVD player 32 positioned substantially within a front cover 72 and a rear cover 70. The DVD player 32 and the screen 40 are positioned parallel to one another, and as both are integrated into the single unit screen console 38, pivot or rotate through the same arc or motion as the housing panel 80 moves from the first or closed position 44 to the second or open position 46.

Additional components are also positioned substantially within the rear cover 70 and the front cover 72 of the screen console 38. All of the components in this embodiment are operatively associated with each other in order to allow the DVD player to function as intended. These components include a plurality of printed circuit boards 62 providing input and output interfaces with a plurality of controls 36, audio connectors 86, power connectors 82, etc. A disc wiper assembly 58 and a screen inverter 186 are also provided within the screen console 38. In this embodiment, the infrared transmitter/receiver 76 and the infrared lens 192 are positioned on the front cover 72 while the second latch mechanism 82 and the wiring harness connector 93 are positioned on the rear cover 70. The latch mechanism includes a latch portion 188 and a spring portion 190. The wiring harness connector 93 corresponds to a wiring harness connector 92 positioned substantially within the housing panel 80.

Figure 16:
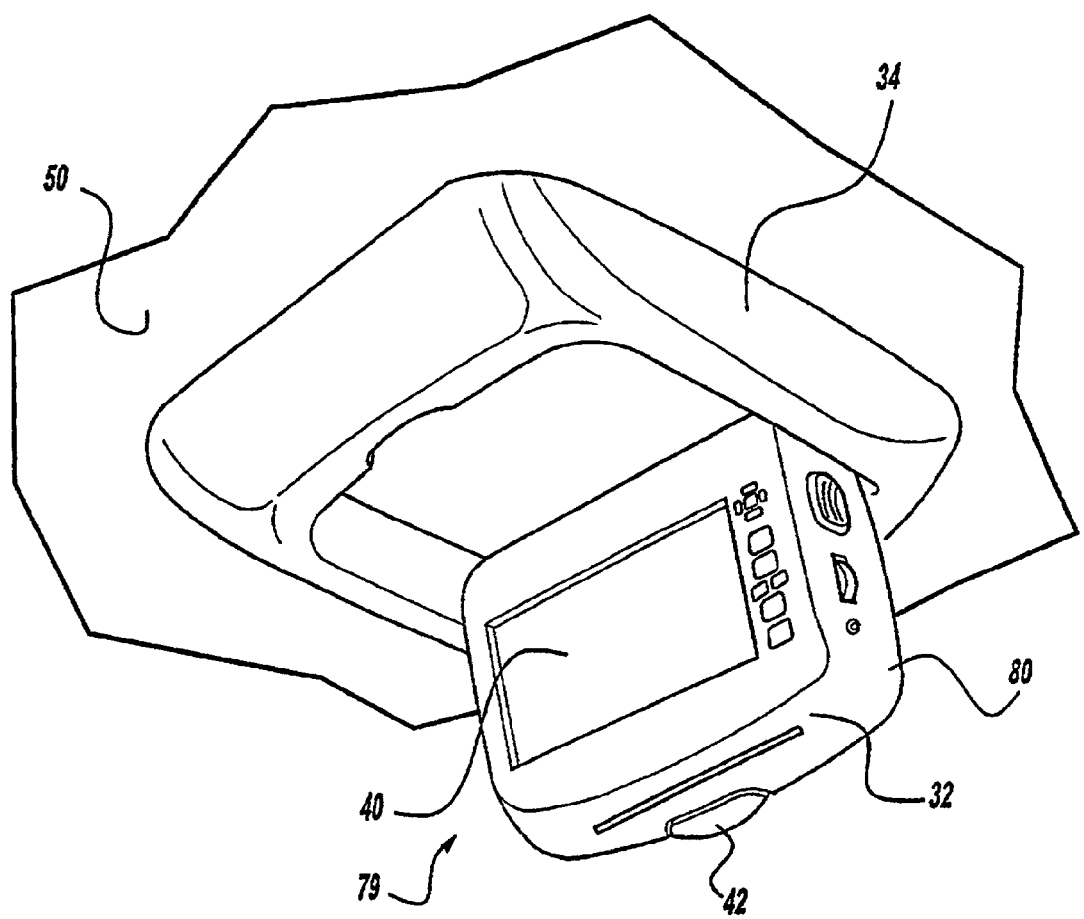
FIG. 16 is a front perspective view of an alternative preferred embodiment made in accordance with the present invention.
Figure 16:
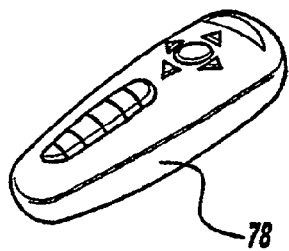

The alternative embodiment described in FIGS. 4, 5, and 17 may also be provided in a manner such that the screen console 38 is not removable from the housing panel 80, as shown in FIG. 16. In this embodiment, the positioning of the components of the video display system 30 is substantially similar to the positioning of the components shown in FIG. 17, the only difference being that the housing panel 80 and the screen console 38 are provided as a single unit without the screen console release feature described above.

Figure 6A:
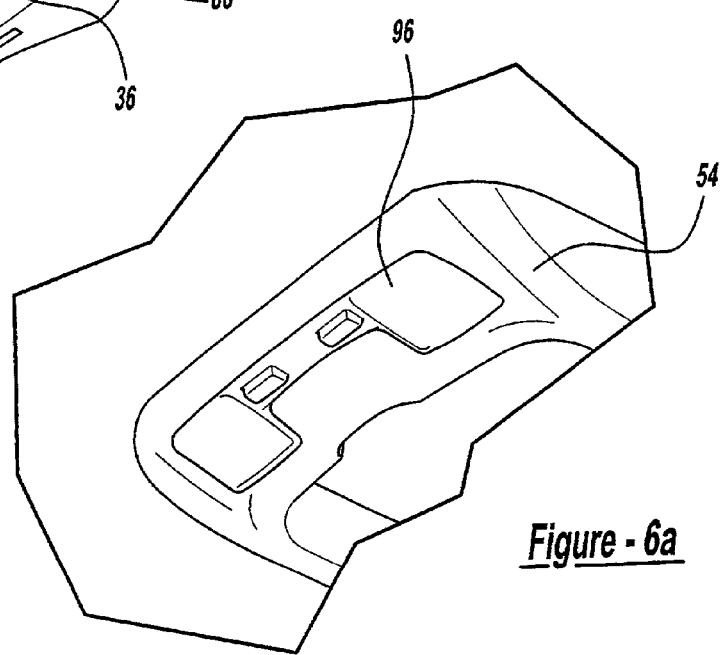
FIGS. 6a and 6b are alternative embodiments of the housing of the embodiment shown in FIG. 4 made in accordance with the present invention.
Figure 6B:
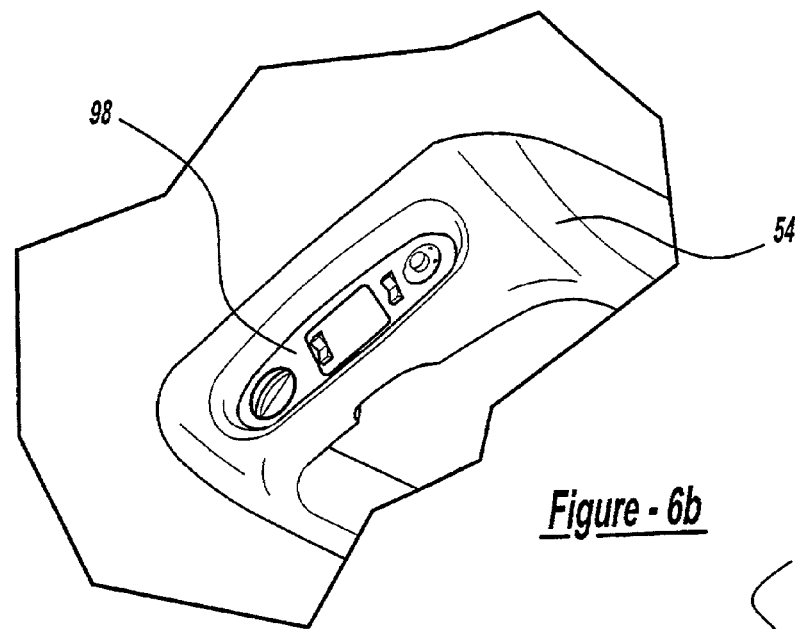

Referring to FIGS. 6a and 6b, a front portion 94 of the bezel portion 54 of the housing 34 may incorporate additional comfort features, including, but not limited to at least one interior lighting system 96 and at least one interior climate control system 98. Additionally, the front portion 94 of the bezel portion 54 may include the integration of a rear seat entertainment module 99 and/or other types of radio station selection control and volume control.

Referring to FIGS. 7a–7c, the second latch mechanism 82 will now be described in further detail. In FIG. 7a, the latch mechanism 82 includes a latch arm 100 rotatably mounted to the screen console 38 and integrally formed with a button portion 102 and an engagement portion 104. The engagement portion 104 is operably associated with a detent 106 positioned in the housing panel 80. When pressure is applied to the button portion 102, the latch arm rotates removing the engagement portion 104 from the detent 106 releasing the second latch mechanism 82 from the panel housing 80. The latch mechanism 82 also includes a retaining slot 108 integrally formed in the screen console 38. The retaining slot 108 is engageable with a corresponding retaining finger 110 integrally formed in the panel housing 80. When the engagement portion 104 of the latch arm 100 has been removed from the detent 106, the retaining slot 108 of the screen console 38 can be disengaged from the retaining finger 110, as shown in FIG. 7b. This facilitates removal of the screen console 38 as shown in FIG. 7c.

One of ordinary skill in the art will appreciate that several variations of this latch mechanism 82 can be used with equal success and, therefore, are within the scope of this disclosure. These include, but are not limited to, positioning the latch arm 100 horizontally with the engagement portion 104 engaging a detent 106 correspondingly positioned in the housing panel 80, and forming the latch mechanism 82 with the latch arm 100, the button portion 102, and engagement portion 104 such that an angle is formed with respect to the positioning of the rotatably mounted latch arm 100 and the engagement portion 104.

Figure 8A:
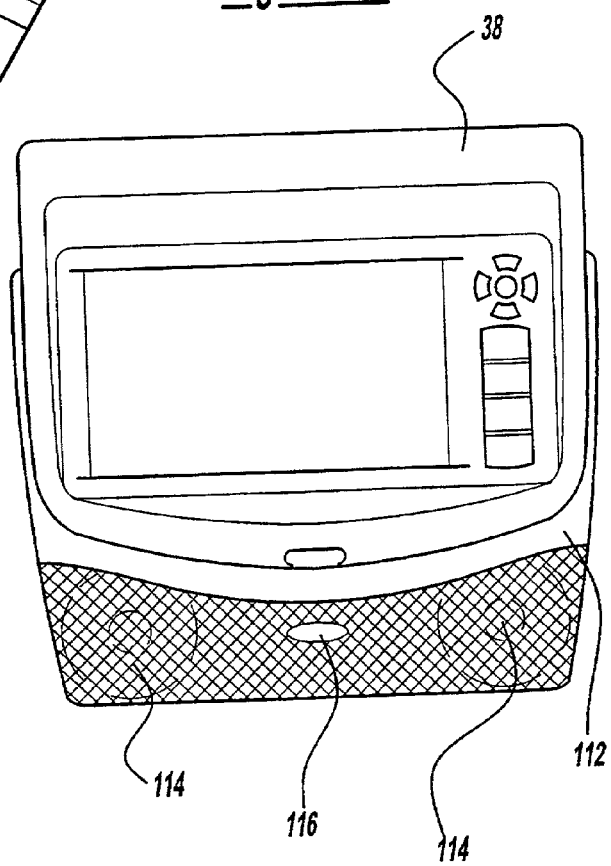
FIG. 8a is a front view of a stand operable with the embodiment shown in FIG. 4 made in accordance with the present invention.
Figure 8B:
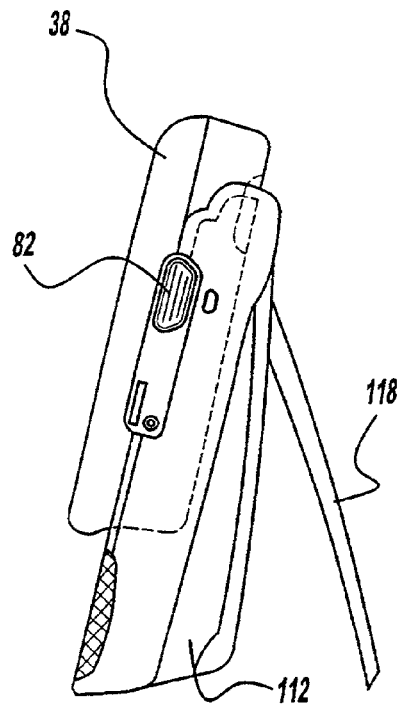
FIG. 8b is a side view of the stand shown in FIG. 8a made in accordance with the present invention.

Referring to FIGS. 8a and 8b, a stand 112 is shown. The video display system 30 of the present invention can be removed from the housing 34 and operably positioned within the stand 112. The stand 112 may include at least one speaker 114 and a power switch 116. The video display system 30 is releasably retained using the second latch mechanism 82 in the same manner as described above. The stand 112 includes a rear leg 118 rotatably attached to the stand 112, thereby providing support so that the video display system can be substantially vertically positioned for viewing. The stand 112 has a wiring harness connector 92 engageable with a wiring harness connector 93 positioned in the screen console 38 as described above providing the required power, audio, etc., connections necessary for operation.

Figure 9:
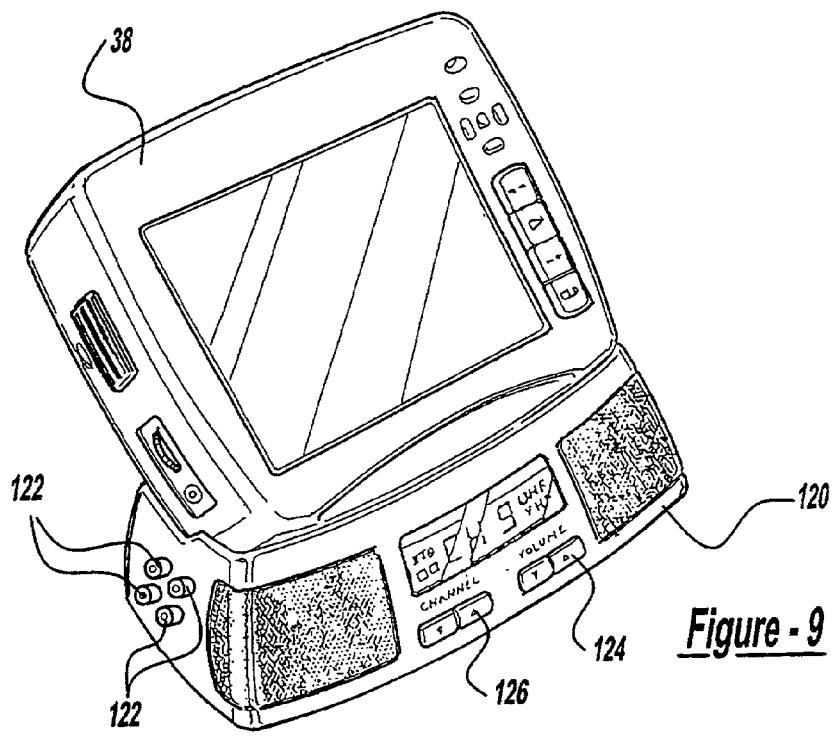
FIG. 9 is a front perspective view of a tuner stand operable with the embodiment shown in FIG. 4 made in accordance with the present invention.

Referring to FIG. 9, the screen console 38 can also be positioned on a tuner 120 and operated either as a DVD player or as a screen for conventionally known TV and cable TV. The tuner also includes connectors for cable, audio, video, and power hookups, shown generally at 122. Additionally, the tuner includes speakers and audio and channel controls shown at 124 and 126.

Figure 10:
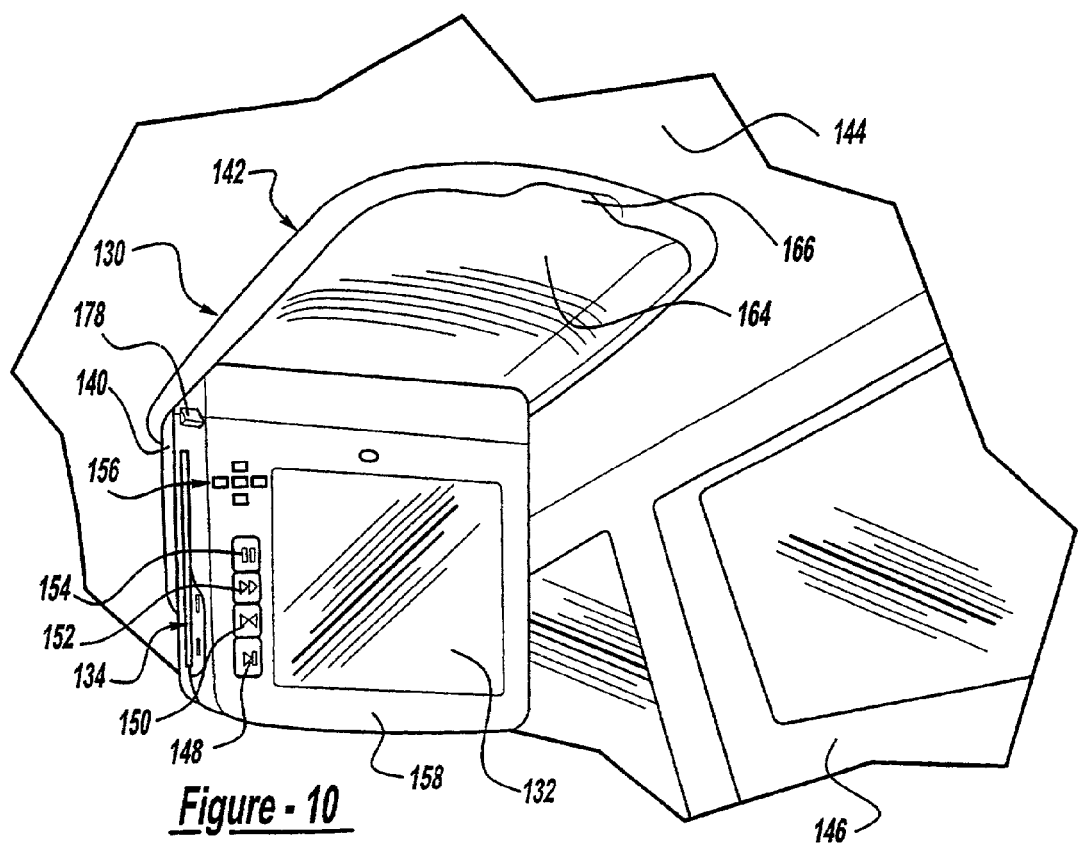
FIG. 10 is a perspective view of an alternative embodiment of the present invention shown in FIG. 4 made in accordance with the present invention.

Referring to FIG. 10, there is shown a video display system 130 in accordance with an alternative embodiment of the present invention. The video display system 130 comprises a liquid crystal display (LCD) screen 132 and a digital video disc (DVD) player 134 integrated in a single housing, referred to hereinafter as the LCD/DVD unit 136. The LCD/DVD unit 136 is removably coupled to a docking member 140, which is in turn pivotably connected to a console 142. The console 142 may be mounted in a number of different areas but in this example is mounted to a headliner 144 of a motor vehicle interior 146. It will be appreciated immediately, however, that the apparatus 130 could just as easily be mounted to a floor console of the vehicle or even on the back of one of the front seats of the vehicle. The apparatus 130 is not limited to automotive applications, and could easily be used within the cabin of a boat or aircraft if desired.

The LCD/DVD unit 136 includes a plurality of controls including a play switch 148, a rewind or search backward switch 150, a fast forward or search forward switch 152 and a pause or still switch 154, A menu control switch assembly 156 enables menu functions to be selected on the display 132.

The compactness of the LCD/DVD unit 136 allows the unit to be readily mounted in a wide variety of areas of a vehicle where a television incorporating a conventional cathode ray tube (CRT) and associated video cassette player would be much to bulky to mount. The entire apparatus 130 is also much lighter in weight, making to easier to secure in overhead areas of a vehicle interior, where a CRT might require significant modifications to the vehicle interior to support the greater weight of a CRT and video cassette player combination.

Figure 11:
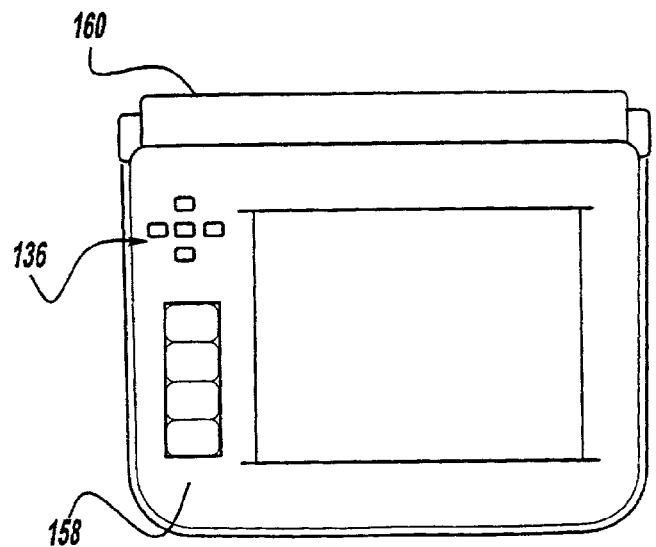
FIG. 11 is an exploded view of the embodiment shown in FIG. 10 made in accordance with the present invention.
Figure 12:
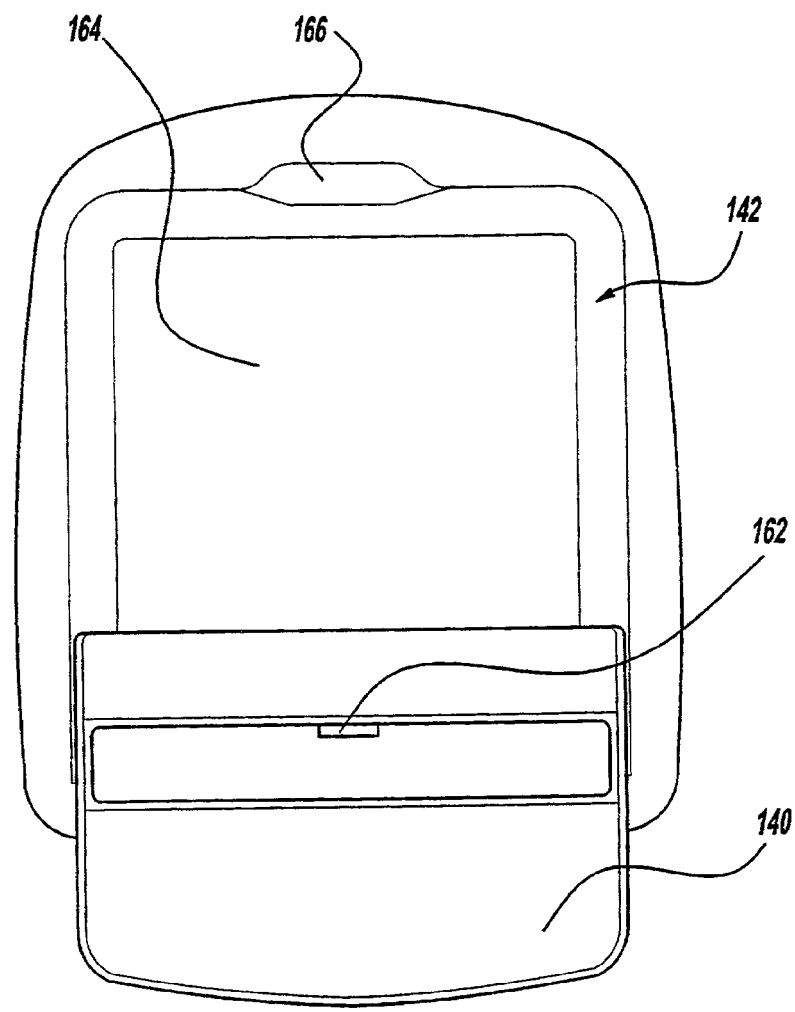
FIG. 12 is a front perspective view of the housing of the embodiment shown in FIG. 10 made in accordance with the present invention.
Figure 13:
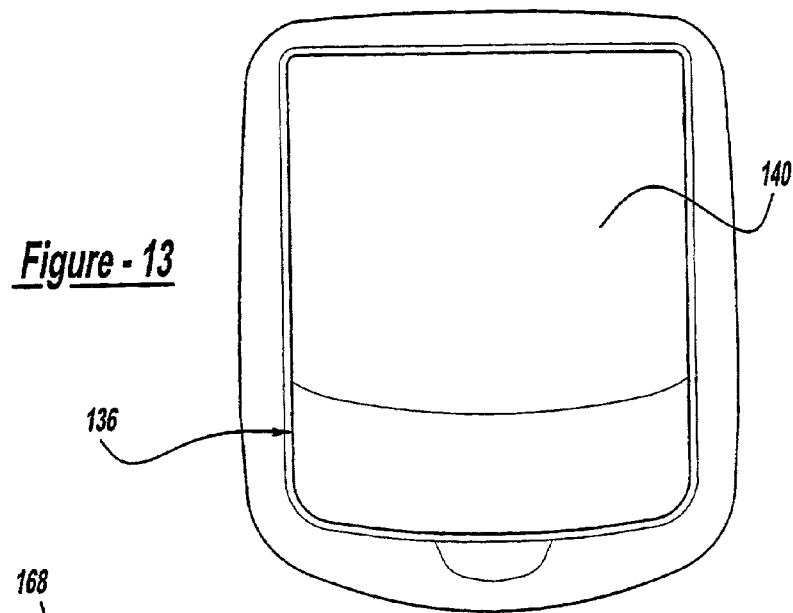
FIG. 13 is a perspective view of the embodiment shown in FIG. 10 made in accordance with the present invention.

With further reference to FIGS. 10 and 11, the LCD/DVD unit 136 includes a molded plastic housing 158. An upper portion 160 of the housing 158 includes an electrical connector (not shown) for coupling with a mating connector 162, shown in FIG. 12, disposed within the docking member 140. The connectors enable power to be provided to the LCD/DVD unit 136. Connectors suitable for this purpose are of the "drawer" type and are commercially available from a wide variety of manufacturers, such as the AMP Corporation.

With further reference to FIG. 10, the console 142 includes a cavity or recess 164 sufficiently deep to hold the LCD/DVD unit 136 therein. A scalloped portion 166 provides an access point where an individual can insert one or more fingers and pull the LCD/DVD unit 136 down into the position shown in FIG. 10.

Figure 14:
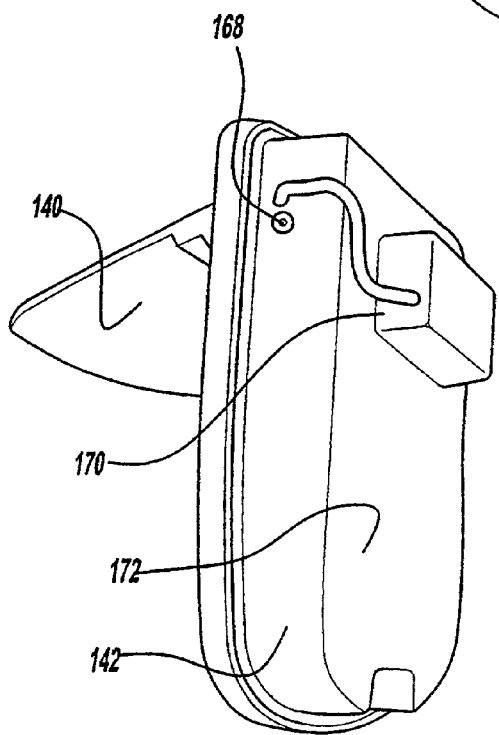
FIG. 14 is a perspective view of the embodiment shown in FIG. 10 made in accordance with the present invention.
Figure 15:
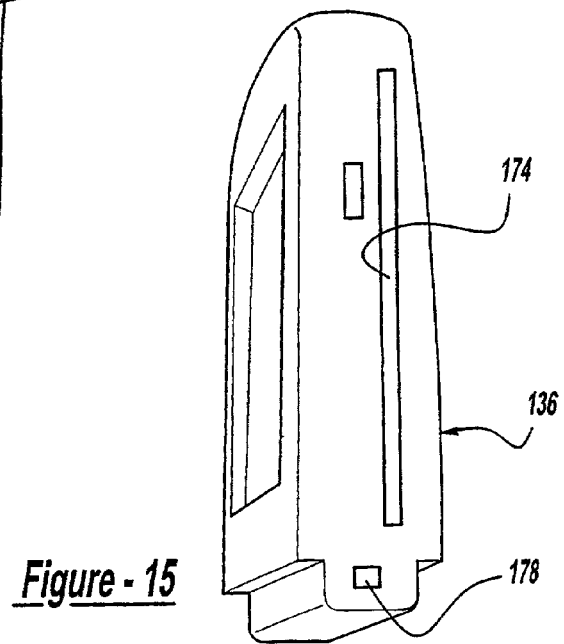
FIG. 15 is a perspective view of the embodiment shown in FIG. 10.

Referring to FIGS. 10 and 14, the docking member 140 is pivotably mounted to the console 142 at point 168 (FIG. 15) on opposite sides of the console 142. The LCD/DVD unit 136 can be held in the closed position by any form of spring biased latch which engages within a recess or notch on the docking member 140 to hold the unit 136 up in the recess 164 once the docking member is urged into the closed position. FIG. 5 also illustrates a power supply 170 for providing power to the LCD/DVD unit 136. The power supply 170 is shown attached to a rear surface 172 of the console 142, although it will be appreciated that this could just as easily be enclosed within a portion of the console 142. FIG. 6 illustrates a slot 174 of the DVD player 176 which receives digital video discs for playback in the LCD/DVD unit 136.

With further reference to FIG. 10, a spring loaded latch 178 is positioned on opposite sides of the housing 158 near the upper end 160 thereof. The latches permit the LCD/DVD unit 136 to be quickly detached from the docking member 140 when it is desired to remove the unit 136 from the vehicle. In this manner, the LCD/DVD unit 136 can be used outside the vehicle provided a suitable AC or DC power source is available.

The apparatus 130 of the present invention thus provides a compact means for playing back and viewing digital video discs. The light weight and compact configuration of the apparatus 130 enables it to be mounted at a variety of areas within a vehicle where it would be impossible or impractical to mount a television having a CRT and an associated videocassette player. The apparatus 130 is quickly and easily removable and light enough to be easily carried about and used outside of the vehicle within which its console is mounted. For example, the apparatus 130 may be removed from the vehicle and placed in another docking station which is located externally of the vehicle. In addition, the apparatus 10 may include other features such as a television tuner and/or a cable adapter to enable television programs to be used.

While the above-described embodiments disclose using a liquid crystal display for the screen 40, it is specifically contemplated and, therefore, within the scope of this disclosure that other types of screens could be used with equal results, including, but not limited to, filled emission displays, organic light emitting diode displays, poly light emitting diode displays, etc.

The foregoing discussion discloses and describes a preferred embodiment of the present invention. One skilled in the art will readily recognize from such discussion, and from the accompanying drawings and claims, that various changes, modifications, and variations can be made therein without departure from the true spirit and fair scope of the invention as defined in the following claims.

What is claimed is:

1. A video display system for a vehicle, said system comprising:
a housing;
a screen console having a screen and being moveably connected to said housing, said screen console being moveable between a first position and a second position; and
a digital video disc player being substantially integrally positioned within said screen console and operably connected to said screen thereby forming a video player unit, wherein said screen is substantially concealable when said screen console is positioned in said first position and said screen is generally visible when said screen console is positioned in said second position;
a latch mechanism positioned on one of said housing and said screen console and configured to releasably attach said video player unit to said housing, said latch mechanism including at least one finger and at least one slot, said at least one finger being engageable with said at least one slot, wherein one of said at least one finger and said at least one slot being formed on said housing and one of said at least one finger and said at least one slot being formed on said screen console.

2. The video display of claim 1 further comprising a stand configured to receive the video player unit, wherein the video player unit is adaptable to be used when operably positioned within the stand when unconnected from the housing.

3. The video display system of claim 1, wherein said screen console is pivotally attached to said housing.

4. The video display system of claim 1, wherein said housing includes at least one audio connector.

5. The video display system of claim 1, wherein said housing includes at least one control panel operable to control the operation of said digital video disc player.

6. The video display system of claim 1, wherein one of said housing and said screen console include an infrared receiver, said infrared receiver operable to receive a plurality of signals from a remote control device.

7. The video display system of claim 1, wherein said video player unit includes a remote power connector operable to receive power from a remote power source.

8. The video display system of claim 1, wherein said video player unit includes a battery source.

9. The video display system of claim 1, wherein said video player unit includes at least one audio connector.

10. The video display system of claim 1, wherein said video player unit is operably connectable to a tuner, said tuner providing at least one of an antenna source, a cable television source, a video source, and a power source.

11. The video display system of claim 10, wherein said tuner includes at least one speaker operably connectable to said screen.

12. The video display system of claim 1, wherein said video player unit includes an infrared receiver, said infrared receiver operable to receive a plurality of signals from a remote control device.

13. The video display system of claim 1, wherein said housing includes a bezel.

14. The video display system of claim 13, wherein said bezel includes at least one light and at least one control device operably associated with said at least one light.

15. The video display system of claim 13, wherein said bezel includes at least one climate control device.

16. The video display system of claim 1, wherein said video player unit is operably connectable to a stand.

17. The video display system of claim 16, wherein said stand includes at least one speaker operably connectable to said video player unit.

18. The video display system of claim 16, wherein said stand includes a stand body and a stand leg, said stand leg be moveably attached to said stand body.

19. The video display system of claim 18, wherein said stand leg is moveably attached to said stand body by a constant force hinge.

20. The video display system of claim 18, further comprising a stop screw positioned substantially within said stand body, said stop screw operably engageable with said stand leg thereby limiting movement of said stand leg.

21. The video display system of claim 16, wherein said stand includes at least one control panel operably connectable to said video player unit.

22. The video display system of claim 1, further comprising a docking member moveably coupled to the housing, wherein the video player unit is configured to removeably couple to the docking member.

23. The video display system of claim 1, wherein said latch mechanism includes a release button having a first end, said first end of said release button being pivotally attached to said video player unit.

24. The video display system of claim 23, said release button having a second end, wherein said second end of said release button is operably engageable with said housing as said second end of said release button pivots about said first end of said release button.

25. The video display system of claim 22, further including a power supply configured to provide power to the screen console when removed from the docking member, and a spring loaded latch configured to provide quick detachment from the docking member.

26. The video display system of claim 1, wherein said screen is a liquid crystal display.

27. The video display system of claim 13, wherein said bezel includes a rear seat entertainment module.

28. The video display system of claim 1, wherein said screen and said digital video disc player are positioned substantially parallel relative to each other such that said screen and said digital video disc player move through a substantially similar motion path as said screen console moves between said first position and said second position.

29. The video display system of claim 1, wherein said screen console includes a rechargeable battery substantially integrated within said screen console.

30. The video display system of claim 1, wherein said screen console includes an infrared transmitter and an infrared receiver, said infrared transmitter being operable to transmit a plurality of signals to a remotely located device and said infrared receiver being operable to receive a plurality of signals from a remote control device.

31. The video display system of claim 1, wherein one of said housing and said screen console include an infrared transmitter, said infrared transmitter operable to transmit a plurality of signals to a remotely located device.

32. A video display system for a vehicle, said system comprising:
a housing;
a housing panel moveably connected to said housing;
a screen console releaseably attached to said housing panel, said screen console having a screen and a digital video disc player operably connected to said screen, each of said screen and said digital video disc player being integrally positioned substantially within said screen console;
a latch mechanism operable to releasably retain said screen console to said housing, said latch mechanism including a release button, at least one finger, and at least one slot, said release button having a first end and a second end, said first end being pivotally attached to screen console and said second end being operably engageable with said housing as said second end pivots about said first end, said at least one finger being engageable with said at least one slot, one of said at least one finger and said at least one slot being formed on said housing and one of said at least one finger and said at least one slot begin formed on said screen console.

33. The video display system of claim 32, wherein the slot is disposed on the screen console and the finger is disposed on the housing.

34. A display system adaptable for use in a vehicle, comprising:
a housing attached to an interior portion of the vehicle;
a panel pivotally attached to the housing;
a video player unit removably attachable to the housing for use in the vehicle or at a location spaced apart from the housing, the video player unit being capable of pivoting between a closed position and an open position when attached to the housing, wherein the video player unit is removeably attached to the panel by a first latch mechanism; and
a power connector operatively coupled to the video player unit and adapted to interchangeably interface with one or more power sources;
wherein the first latch mechanism includes a pushbutton on the video player unit cooperative with a detent in the panel for releasably securing the video player unit to the panel.

35. The video display system of claim 34, wherein the panel is pivotally attached to the housing by a torque hinge.

36. The video display system of claim 34 wherein the video player unit includes a digital video disc player.

37. The video display system of claim 34 wherein the video player unit includes a liquid crystal display screen.

38. The video display system of claim 34 further comprising a second latch mechanism to releasably retain the video player unit in the closed position when the video player unit is attached to the housing.

39. The video display system of claim 34 wherein the video player unit includes an infrared receiver operable to receive control signals from a remote control device.

40. The video display system of claim 34 wherein the video player unit includes an infrared transmitter operable to send audio signals to remote locations.

41. The video display system of claim 34 wherein the video player unit includes a plurality of controls to operate the video player unit.

42. The video display system of claim 34 wherein the power source is a rechargeable battery.

43. The video display system of claim 34 wherein the power source is the vehicle's electric power supply.

44. The video display system of claim 34 wherein the housing is attached to a headliner within the vehicle.

45. The video display system of claim 34 further comprising a stand, wherein the video player unit may be operatively positioned on the stand for use when the video player is removed from the housing.

46. The video display system of claim 45 wherein the stand includes at least one speaker and a plurality of controls for operating the video player unit.

47. The video display system of claim 34 further comprising a tuner, wherein the video player unit may be operatively positioned on the tuner for use when the video player is removed from the housing.

48. The video display system of claim 47 wherein the tuner includes at least one speaker and a plurality of controls for operating the video player unit.

49. A display system adaptable for use in a vehicle, comprising:
means for providing a housing in the vehicle;
means for removably attaching a video player unit to the housing for use within the vehicle and for use at a location spaced apart from the housing, wherein the means for removeably attaching the video player unit to the housing includes a first latch mechanism having a pushbutton on the video player unit cooperative with a detent in the housing for releaseably securing the video player unit to the housing;

means for controlling the operation of the video player unit;

means for providing power to the video player unit from one or more power sources;

means for moving the video player unit from a closed position to an open position when the video player unit is attached to the housing;

means for releasably maintaining the video player unit in the closed position when the video player unit is attached to the housing; and means for positioning and operating the video player unit when the video player unit is used in the spaced apart location.

* * * * *

UNITED STATES PATENT AND TRADEMARK OFFICE
CERTIFICATE OF CORRECTION

| | | |
|---|---|---|
| PATENT NO. | : 7,084,932 B1 | Page 1 of 1 |
| APPLICATION NO. | : 09/868536 | |
| DATED | : August 1, 2006 | |
| INVENTOR(S) | : Larry E. Mathias, Paul D. Hurley and L. Matthew Leeka | |

It is certified that error appears in the above-identified patent and that said Letters Patent is hereby corrected as shown below:

Column 12:
line 31, replace "claim 34" with --claim 39--.

Signed and Sealed this

Thirtieth Day of January, 2007

JON W. DUDAS
*Director of the United States Patent and Trademark Office*